(No Model.)
R. H. READ.
SYSTEM FOR SYNCHRONIZING ELECTRIC MOTORS.
No. 411,612. Patented Sept. 24, 1889.
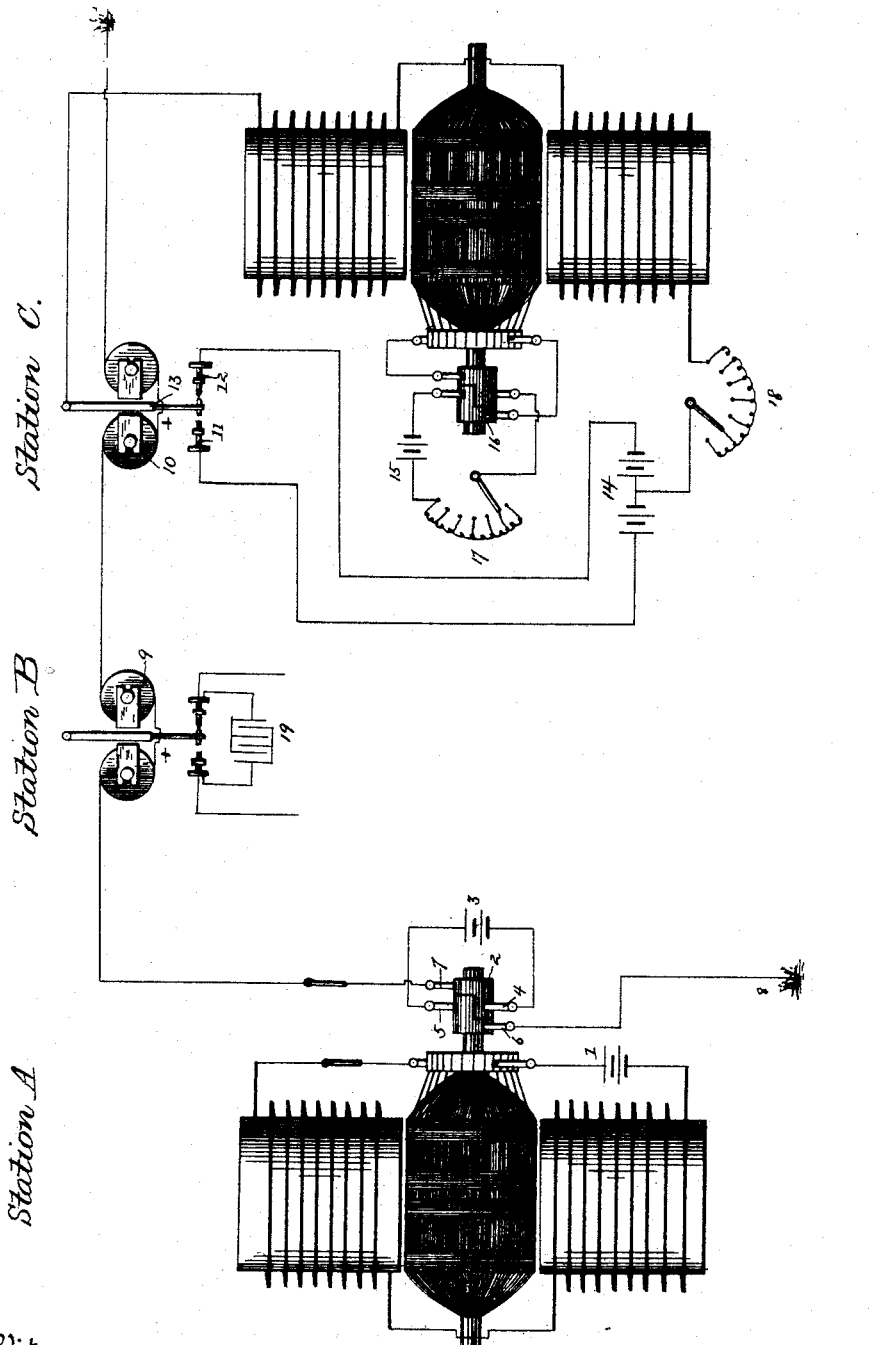
Witnesses
Inventor

UNITED STATES PATENT OFFICE.

ROBERT HAMILTON READ, OF WASHINGTON, DISTRICT OF COLUMBIA.

SYSTEM FOR SYNCHRONIZING ELECTRIC MOTORS.

SPECIFICATION forming part of Letters Patent No. 411,612, dated September 24, 1889.

Application filed April 3, 1889. Serial No. 305,900. (No model.)

*To all whom it may concern:*

Be it known that I, ROBERT HAMILTON READ, a citizen of the United States, residing at Washington, in the District of Columbia, have invented certain new and useful Improvements in Systems for Synchronizing Electric Motors; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

This invention has for its object the production and preservation of a synchronous movement of rotating parts at distant stations with a view to rendering such movement available for telegraphic or other purposes.

In a prior application filed by me, Serial No. 299,627, February 12, 1889, I described a system of synchronism in which each driven motor was of the ring or drum armature type and had one of its circuits excited by a current of constant direction, and its other circuit connected to a source of energy through two pole-changers, one operated by the line-currents and the other by the moving part of the driven motor. So long as the driven motor made half-revolutions in times corresponding to the line-current changes the two pole-changers coincided and a continuous driving effort was maintained on the driven motor; but on any failure of coincidence of the two pole-changers, as where the driven motor varied in its times from the line-current changes, a correction in speed was made. In my present invention, the two pole-changers are placed in different circuits, one controlling the armature and the other the field-magnet circuit of the driven motor. Periodic changes or reversals of current are produced in both circuits, causing reversals in magnetism in both the armature and field magnets. So long as the reversals in magnetism coincide in point of time the driving effort will be constant. If they vary, a reversal in magnetism of one part will correct the speed and synchronism will be established.

The present invention consists, therefore, in causing periodic reversals of magnetism in both field-magnet and armature of the driven motor, these reversals being substantially simultaneous. It embodies also other features, which will be particularly pointed out in the accompanying claims. The driven motor normally moves at a pace somewhat faster than the current changes on line or than the speed of the driving-motor, suitable adjustable resistances being interposed to regulate the speed to the proper rate. When any variation from synchronism occurs, therefore, a reversal in magnetism of one part occurs and checks the moving part, bringing it to a synchronous pace.

In the accompanying drawing, which diagrammatically illustrates my invention, three stations A, B, and C are shown, at which are located electric motors. The motor at A is shown as independently operated and as producing the current changes on line which control the other motors of the system. The motor at A might, however, also be a driven motor, the current changes on line being produced by any suitable agency, several of which were illustrated and described in my former application above adverted to, all of the motors in such case being driven or governed motors. The motor at A is shown as having its field-magnet and armature-circuits connected in series relation to each other and connected to a source of electric energy 1. Any suitable motor may be used at station A, as its only function is to operate a current-changer 2 and cause periodic current changes on line. An electric motor is shown, however, of the ring or drum armature type. A line-battery 3 has its poles connected to brushes 4 5, the two sides of the line-wire being connected to brushes 6 7. The current-changer has two ring-contacts on which brushes 6 7 bear, and two overlapping semi-cylindrical surfaces which alternately exchange contacts with brushes 4 5. One side of the line may be grounded, as shown at 8, at the driving-station, and another ground may be made at the distant end of the line. At the driven stations are interposed in the line-circuit vibrators 9 10, the armatures of which are vibrated by the line-current. The circuit-connections at the several driven stations are identical. I have therefore shown them in detail only at one station. The contacts 11 12, between which the armature 13 of the vibrator rocks, are connected to the two sides of the split battery 14, the middle point of which is connected through a variable resistance to one of the motor-circuits and the pivotal point of the armature 13. The field-magnet coils are shown as connected in this circuit, and the armature has an independent source of energy 15, and carries a pole-changer on its spindle. Either motor-circuit, however, might be controlled by the vibrator and the other by the rotating pole-changer 16. The driven machine is of the ring or drum armature type—that is to say, one which will operate under a constant relative polarity of its field-magnet and armature. The pole-changer 16 is provided with two ring-contacts insulated from one another and having overlapping semi-cylindrical edges, and four co-operating brushes bearing on the rings and the overlapping edges, respectively, two of which, as the ring-brushes, are connected with the commutator brushes, as shown, and the other two with a local battery through a variable resistance.

The operation will now be understood. Under the influence of the current changes on line the vibrator-armature is kept rocking in unison with the half-revolutions of the motor at station A. As it rocks between its contact-stops, current is reversed in the field-magnet circuit. Let us suppose that the machines be set in operation. The variable resistances 17 18, or either of them, are adjusted so that the motor at C would, if current were constantly maintained in both its circuits, move at a faster pace than the motor at A. By making such an arrangement the motor at C can never fall behind the motor at A, but has a constant tendency to gain upon it. The only correction it will need, therefore, will be an occasional retarding influence sufficient to hold it in practical synchronism. It will be seen that the field-magnet circuit and the armature-circuit are each reversed at regular periods, the tongue 13 of the vibrator reversing the field-current, and the pole-changer 16 reversing the armature-current. The tongue 13 is shown as bearing on contact 12, and is held there by the line-current. The left wing of the split battery 14 is sending current through the field-magnet coils and giving the field-magnet a definite polarity. The armature is polarized by the battery 15, and by adjustment of the resistance 17 to a proper degree the armature will have completed a half-revolution a little before the tongue 13 of the vibrator reaches the opposite contact under a change of line-current. The moment the armature completes a half-revolution, however, its exciting-current is reversed by the pole-changer 16 and a retarding influence is exerted, holding back the armature until the tongue 13 is shifted to the opposite contact 11, when a reversal of the field-magnet current is made, and the poles of the armature are again attracted by the field-magnet poles and its second half-revolution is made. Each driven motor, therefore, has independent circuits, each of which has its own pole-changer. If the two pole-changers move synchronously, they vary the current simultaneously in the circuits they control, and both magnetic elements of the driven motor will be simultaneously reversed, and by reason of the structure of drum armature motors continuous motion will be preserved. As one pole-changer is controlled by the line-current, it is only necessary to cause the other pole-changer to perform its reversing function at the proper time. By mounting this pole-changer on the spindle of the armature, or moving part of the driven motor and properly adjusting the resistance 17, the half-revolutions of the pole-changer 16 can be made to occur at very nearly the same times as the oscillations of the tongue 13, and by giving the resistance a slight further adjustment the changes can be made to occur always a little before the changes in the circuit controlled by the tongue 13. The difference in speed is corrected at every half-revolution of the moving part of the driven motor, and when the speed is four hundred or five hundred revolutions per minute the two pole-changers practically coincide and the machines move in accurate synchronism. The two pole-changers should be so constructed that the line of division between the overlapping edges is as fine as possible, and the brushes co-operating with the half-ring contacts should bear accurately at opposite diametrical points. The vibrator-contacts will be given the proper adjustment to secure the best results. If the exciting-current controlled by the vibrator be of such an intensity that there exists deleterious sparking at the contacts, a condenser, resistance, or other spark-arrester may be placed in a shunt around the contacts, as indicated at 19, station B. As the motors have but little work to perform, however, they can be so wound that they will perform their functions under a current which will not create injurious sparks. For high speeds I prefer to use a vibrator with neutral cores in its magnets, some form of laminated core sensitive to rapid changes of magnetism being preferred as a core of soft-iron wire or sheet metal. In such cases the armature or tongue of the vibrator will be permanently polarized.

While I have shown batteries as the source of electric energy dynamo or magneto electric machines might be used for the line-current, being adjusted to produce the current changes with the proper frequency. Such sources might also be used for supplying the driven machines.

Having thus described my invention, what I claim, and desire to secure by Letters Patent, is—

1. A system for synchronizing electric motors, comprising a controlling-circuit, a current-changer for producing periodic current changes in said circuit, two or more motors at distant stations, having field-magnet and armature circuits, in one of which circuits current varies in accordance with the changes in the controlling-circuit, and a local-current changer actuated by the moving part of each driven motor for producing corresponding changes in the other motor-circuit, whereby a continuous driving effort will be maintained on the driven motor as long as the changes in the two motor-circuits are simultaneous.

2. A system for synchronizing electric motors, comprising a controlling line-circuit, a current-changer for producing periodic current changes in said circuit, one or more driven motors having independent field-magnet and armature circuits, one of which varies in accordance with the line changes, the other containing a local-current changer actuated by the moving part of the driven motor, whereby a continuous driving effort will be maintained on the driven motor as long as the changes in the two independent circuits are simultaneous.

3. A system for synchronizing electric motors, comprising a controlling line-circuit in which periodic current changes are produced, one or more driven motors of the ring or drum armature type governed by said circuit, the driven motor having field-magnet and armature circuits, in one of which current is reversed in accordance with the line-current changes, and a pole-changer actuated by the moving part of the driven motor for producing reversals in the other motor-circuit at times corresponding to the line changes, whereby simultaneous reversals and continuous driving effort are produced so long as the moving part is synchronous with the line changes.

4. A system for synchronizing electric motors, comprising a controlling line-circuit in which periodic current changes are produced, one or more driven motors of the ring or drum armature type governed by said circuit, a pole-changer for reversing the magnetism of one element of a driven motor in accordance with the changes of the line-current, a pole-changer actuated by the moving part of the driven motor for reversing the magnetism of the other element of the motor at times corresponding to the line changes, and a variable resistance in one or both motor-circuits for varying the strength of its exciting-current, for the purpose described.

5. A system for synchronizing electric motors, comprising a controlling line-circuit in which periodic current changes are produced, an electro-magnet having a neutral core in said line-circuit, a vibrating armature actuated by said magnet in accordance with the line changes, a driven motor having one of its circuits reversed by the vibrating armature in accordance with the line changes, and a pole-changer actuated by the moving part of the driven motor for reversing current in the other motor-circuit at times corresponding to the line changes, whereby simultaneous reversals and therefore continuous driving effort are produced so long as the moving part is synchronous with the line changes.

6. A system for synchronizing electric motors, comprising a controlling line-circuit in which periodic current changes are produced, an electro-magnet having a neutral core in said line-circuit, a vibrating armature actuated by said magnet in accordance with the line-changes, a driven electric motor, and a local source of energy connected to the driven motor and the vibrator, whereby the speed of the motor conforms to the current changes on line and high speeds of the vibrators and driven motors may be maintained.

In testimony whereof I affix my signature in presence of two witnesses.

ROBERT HAMILTON READ.

Witnesses:
W. C. REICHENDER,
E. H. BOND.